Sept. 1, 1931.  D. E. GAMBLE  1,821,150

FRICTION CLUTCH

Filed Aug. 19, 1929

Inventor:
David E. Gamble
By Wm. O. Belt atty.

Patented Sept. 1, 1931

1,821,150

UNITED STATES PATENT OFFICE

DAVID E. GAMBLE, OF CHICAGO, ILLINOIS, ASSIGNOR TO THE BORG & BECK COMPANY, OF CHICAGO, ILLINOIS, A CORPORATION OF ILLINOIS

FRICTION CLUTCH

Application filed August 19, 1929. Serial No. 386,854.

This invention relates to friction clutches and it is especially adapted for those clutches which are employed in automobiles and other motor driven vehicles.

The principal object of the invention is to hold the levers which are employed for releasing the pressure ring substantially rigid in all positions thereof so as to eliminate play between the parts and the wear and noise which would result therefrom.

And a further object of the invention is to provide wear plates on the pressure ring to be engaged by the levers and which can be renewed as required.

In the accompanying drawings illustrating a selected embodiment of my invention

Fig. 2 is an elevation.

Figure 6:
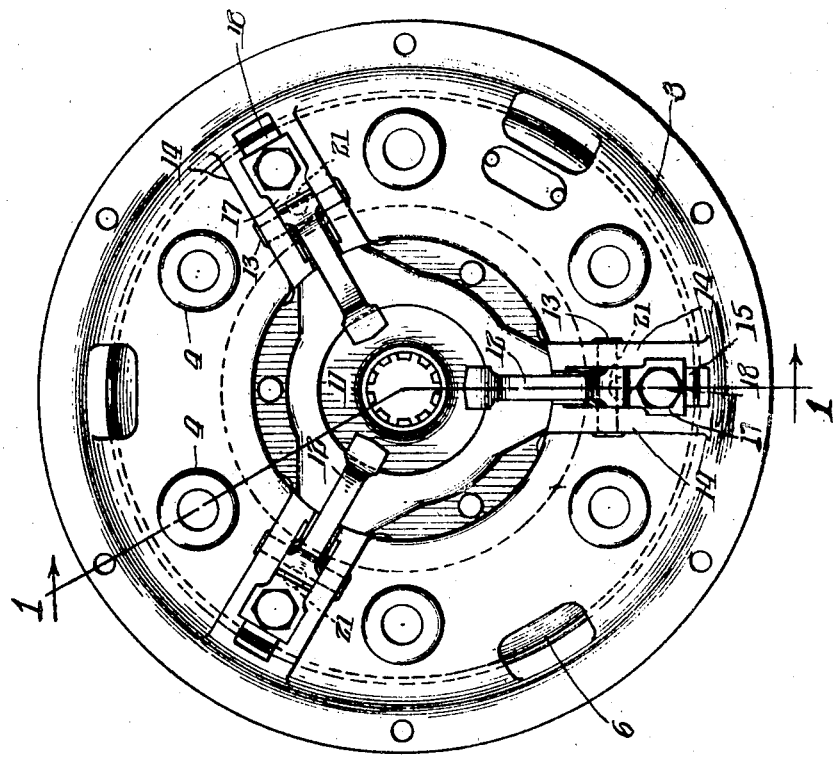
Figure 1:
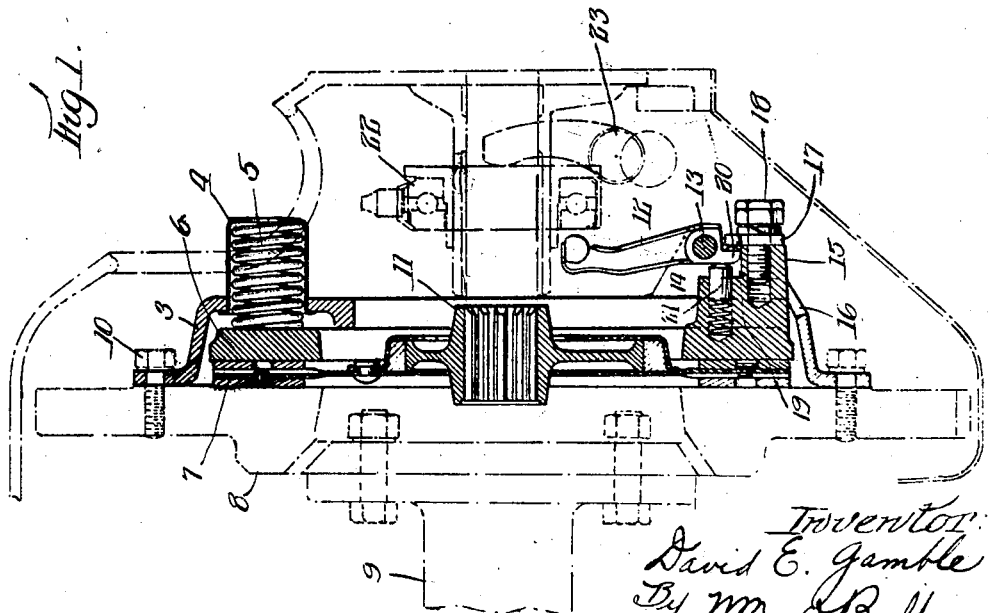
Fig. 1 is a section on line 1—1 of Fig. 2.

Referring to the drawings 3 is the cover plate of the clutch which is provided with sockets 4 to receive springs 5 which bear directly upon the thrust or pressure ring 6 and press the friction faced driven plate 7 into engagement with the flywheel 8 which is made fast to the driving or crank shaft 9. The cover plate is secured to the flywheel by bolts 10 and the driven plate 7 has a hub 11 to receive the driven shaft. Levers 12 are provided with pivot pins 13 which are pivotally mounted in lugs 14 on the cover plate. Posts 15 on the pressure plate project outward through openings 16 in the cover plate between the lugs 14 and wear plates 17 are removably secured on the outer ends of these posts by bolts 18. Each post is stepped or recessed at 19 and the wear plate projects inwardly over this recess to be engaged by a projection 20 on the outer end of the lever 12. Spring-pressed studs 21 are mounted in the posts to engage projections 20 on the levers; the arrangement being such that the spring-pressed studs engage the said projections on one side to force the projections on their opposite side into constant engagement with the wear plates. The levers 12 are radially disposed and their inner ends are adapted to be operated by a release device which may comprise a ball bearing collar 22 and a yoke lever 23 or other suitable means The levers 12 are held by the spring-pressed studs 21 substantially rigid in any position thereof and in contact with the wear plates 17. The studs press against the projections on the outer ends of the levers and press these projections into constant engagement with the wear plates so that the levers are constantly held against any tendency to rattle while the clutch is in engagement. When the release device is caused to operate the levers for withdrawing the pressure ring the levers will then be held against any tendency to rattle; but at all times the spring-pressed studs hold the projections on the levers which are, in fact, the outer ends of the levers, in constant contact with the wear plates to eliminate play between these parts and the wear and noise which would result therefrom. The wear plates 17 may be replaced as often as required and the bolts forming convenient means for permitting this to be done easily.

I have shown the invention in a simple embodiment in one type of clutch but it will be understood that this is for purposes of illustration and description and the invention may be used in other types of clutches with such changes in the construction and arrangement of parts as may be necessary to adapt it to different constructions and within the scope of the following claims:

I claim:

In a friction clutch, the combination of a cover plate having openings therein, a pressure ring having posts projecting outwardly through said openings, lugs on the cover plate adjacent said openings, wear plates removably secured on the outer ends of the posts and projecting inwardly beyond the posts, levers pivotally mounted in said lugs, projections on the outer ends of said levers, and spring-pressed studs in the posts bearing against the said projections and holding said projections in contact with the wear plates.

DAVID E. GAMBLE.